United States Patent [19]

Tuckey

[11] Patent Number: 4,789,308
[45] Date of Patent: Dec. 6, 1988

[54] SELF-CONTAINED ELECTRIC FUEL PUMP WITH OUTPUT PRESSURE REGULATION

[75] Inventor: Charles H. Tuckey, Cass City, Mich.

[73] Assignee: Walbro Corporation, Cass City, Mich.

[21] Appl. No.: 126,517

[22] Filed: Nov. 30, 1987

Related U.S. Application Data

[63] Continuation-in-part of Ser. No. 917,633, Oct. 10, 1986, Pat. No. 4,728,264.

[51] Int. Cl.⁴ .................. F04B 49/06; F04B 17/00; H01H 35/38
[52] U.S. Cl. ................................ 417/44; 417/366; 200/82 E; 338/32 H
[58] Field of Search .................. 417/44, 38, 366; 200/82 E; 338/32 H

[56] References Cited

U.S. PATENT DOCUMENTS

| | | | |
|---|---|---|---|
| 2,716,381 | 8/1955 | Parker | 417/44 |
| 2,717,553 | 9/1955 | Parker | 417/44 |
| 3,327,079 | 6/1967 | Widl | 200/82 E |
| 3,418,991 | 12/1968 | Shultz et al. | 417/366 X |
| 3,431,375 | 3/1969 | Hotchkiss | 200/82 E |
| 3,711,222 | 1/1973 | Hartley | 417/44 |
| 4,349,814 | 9/1982 | Akehurst | 338/32 H X |
| 4,447,192 | 5/1984 | Tuckey | 417/366 X |
| 4,581,941 | 4/1986 | Obermann et al. | 338/32 H X |
| 4,691,185 | 9/1987 | Lowbier et al. | 338/32 H |

FOREIGN PATENT DOCUMENTS 424990 2/1975 U.S.S.R. .................. 417/38

Primary Examiner—Paul F. Neils
Attorney, Agent, or Firm—Barnes, Kisselle, Raisch, Choate, Whittemore & Hulbert

[57] ABSTRACT

A self-contained electric fuel pump includes a pair of coaxially spaced inlet and outlet end caps joined by a case to form a pump housing. A d.c. motor includes an armature journaled for rotation within the housing and coupled to a pump mechanism for feeding fuel through the housing from the inlet to the outlet, fuel within the housing surrounding the armature being at substantially outlet pressure. A pressure sensor comprises a magnetic piston slideable against adjustable spring force within a bore in the outlet end cap as a function of fuel pressure within the pump housing. A Hall sensor is responsive to varying magnetic field as a function of piston position for applying electrical power to the pump armature as a function of pump outlet pressure.

6 Claims, 2 Drawing Sheets

SELF-CONTAINED ELECTRIC FUEL PUMP WITH OUTPUT PRESSURE REGULATION

This application is a continuation-in-part of application Ser. No. 917,633, filed Oct. 10, 1986, now U.S. Pat. No. 4,728,264.

The present invention is directed to electric-pump fuel delivery systems for gasoline engine and like applications, and more particularly to control of fuel line pressure at the pump output.

It is an object of the present invention to provide pressure control for the electric pump of a fuel delivery system which reduces energy consumption and increases pump life, which reduces pump noise, and which maintains substantially constant pressure in the fuel delivery line to the engine. Another object of the invention is to provide an electric fuel pump which embodies self-contained output pressure regulation, and which is economical to manufacture and assemble.

The invention, together with additional objects, features and advantages thereof, will be best understood from the following description, the appended claims and the accompanying drawings in which:

Figure 1:
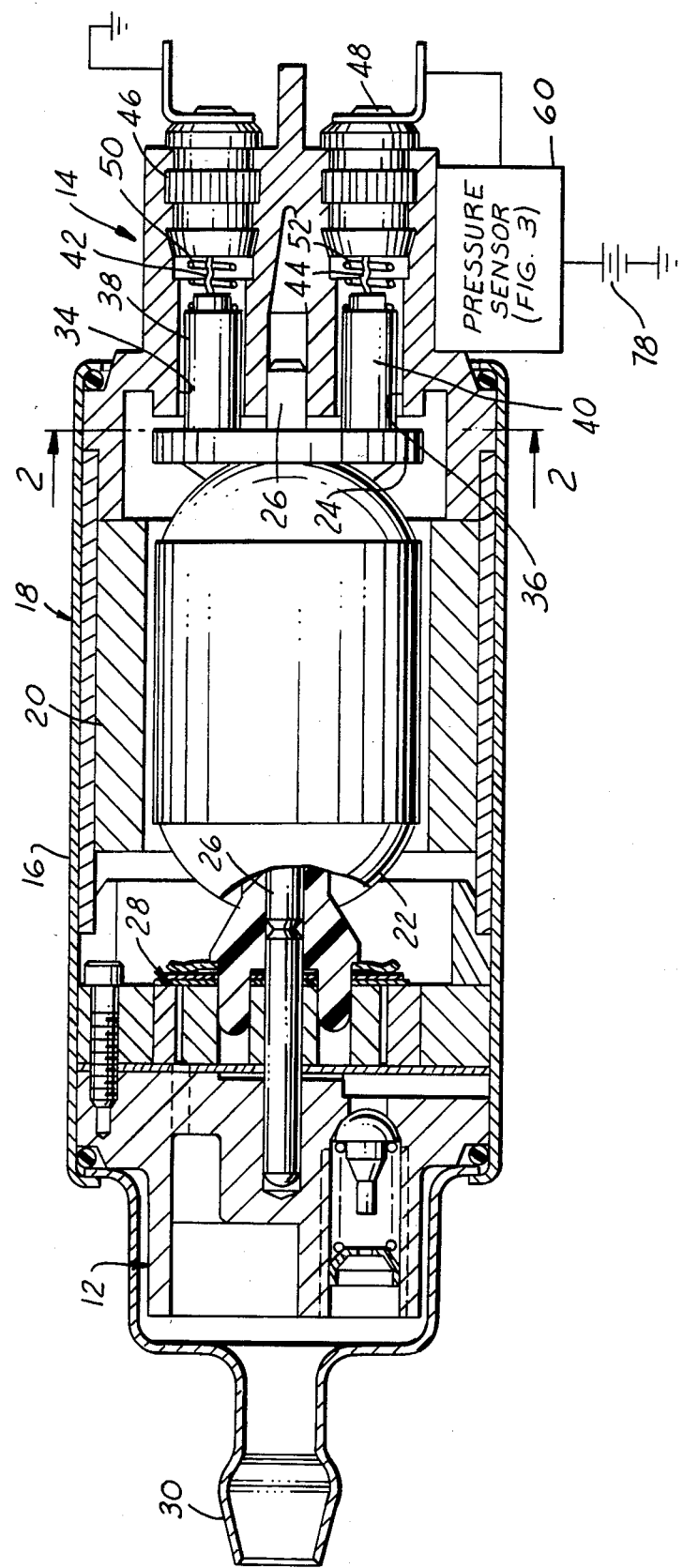
FIG. 1 is a longitudinal bisection of a self-contained electric fuel pump embodying pressure control in accordance with a presently preferred embodiment of the invention.
Figure 2:
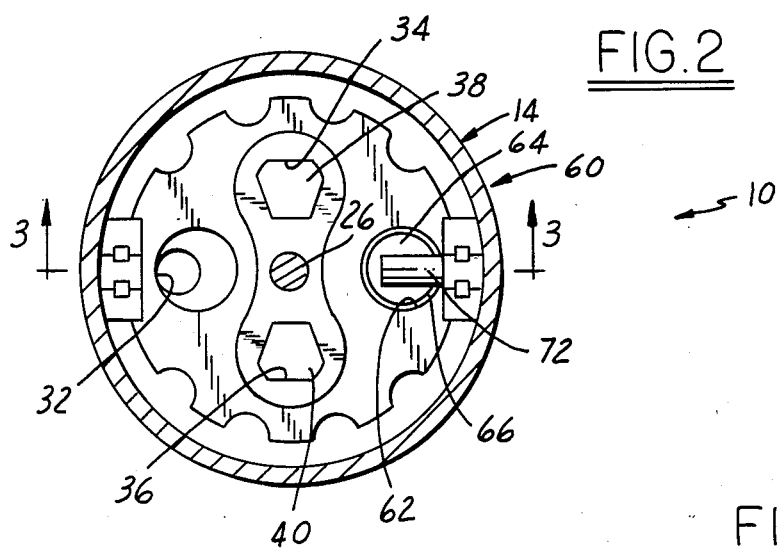
FIG. 2 is a sectional view taken substantially along the line 2—2 in FIG. 1.
Figure 3:
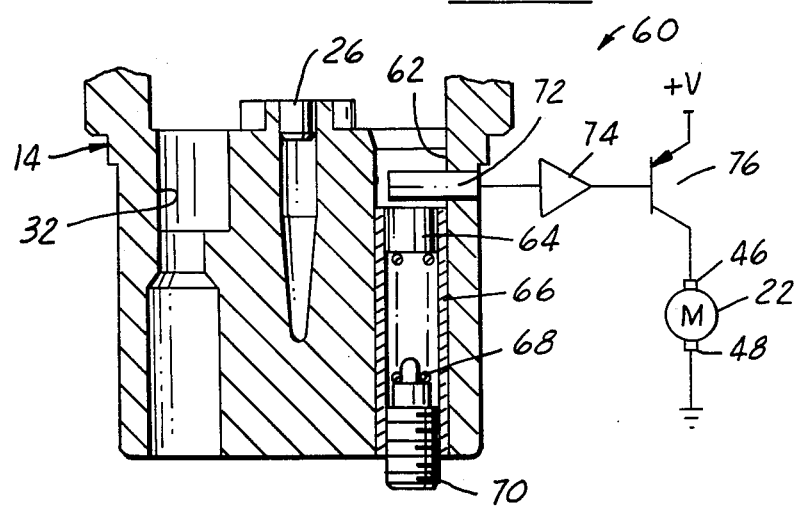
FIG. 3 is a fragmentary sectional view taken substantially along the line 3—3 in FIG. 2 and which schematically illustrates the pump pressure control electronics.

FIGS. 1-3 illustrate an electric-motor fuel pump 10 in accordance with a presently preferred embodiment of the invention as comprising an inlet end cap 12 and an outlet end cap 14 interconnected by a cylindrical case 16 to form a hollow pump housing 18. A permanent magnet stator 20 is carried within case 16 surrounding an armature 22 which has electrical windings connected to a commutator plate 24. Armature 22 is journaled between end caps 12, 14 by a shaft 26 for rotation within housing 18. Armature 22 is coupled to a vane or gear system 28 for pumping fuel from an inlet 30 through inlet end cap 12 to the volume of housing 18 surrounding armature 22, and thence through an outlet port 32 (FIGS. 2 and 3) in outlet end cap 14 to the engine (not shown). Fuel within housing 18 surrounding armature 22 is thus at substantially pump output pressure. Outlet end cap 14 has a pair of spaced passages 34, 36 parallel to the axis of rotation of armature 22 and shaft 26. A pair of brushes 38, 40 are respectively slideably received within passages 34, 36. As shown in FIG. 1, brushes 38, 40 are respectively connected by wire conductors 42, 44 to electrical terminals 46, 48 on end cap 14 for connection of brushes 38, 40, commutator plate 24, and armature 22 to a source of d.c. electrical power. A pair of springs 50, 52 are captured in compression between respective brushes 38, 40 and terminals 46, 48 within passages 34, 36 for urging brushes 38, 40 into mechanical and electrical contact with commutator plate 24. To the extent thus far described, pump 10 is similar to those disclosed in U.S. Pat. Nos. 4,352,641 and 4,596,519 assigned to the assignee hereof and to which reference is made for more detailed background discussion of such pump structure.

In accordance with the present invention, a pressure sensor 60 (FIGS. 2 and 3) is carried by housing 18, specifically by outlet end cap 14, and is responsive to fuel pressure within housing 18 surrounding armature 22 for controlling or regulating current to the pump armature. Pressure sensor 60 in a presently preferred embodiment of the invention comprises a bore 62 formed in outlet end cap 14 at a position diametrically opposed to outlet port 32 and opening into the housing cavity surrounding armature 22. A piston 64 of permanent magnet construction is slideable within a sleeve bearing 66 press fitted into bore 62. A coil spring 68 is captured within bearing 66 between piston 64 and a spring base 70 which is threaded into the axially outer end of sleeve 66 for adjusting spring pressure on piston 64. A Hall-effect sensor 72 is carried by end cap 14 and projects into bore 62 axially inwardly of piston 64—i.e., adjacent to the inlet to bore 62 from the pump housing volume. Sensor 72 provides an electrical output signal to an amplifier 74 which varies as a continuous monotonic function of position of piston 64 relative to sensor 72. The output of amplifier 74 is coupled through to the base of a transistor 76 which has an emitter and collector connected in series with terminals 46, 48 and armature 22 across a source of d.c. power such as the vehicle battery 78 (FIG. 1).

In operation, position of piston 64 within sleeve bearing 66 varies with the differential between fuel pressure exerted on the inboard face of piston 64 and spring pressure exerted on the outboard piston face. The position of piston 64 for a given pump output pressure is adjustable by means of spring base 70. Varying position of magnetic piston 64 results in a corresponding change of magnetic field strength at sensor 72 and a consequent change in sensor electrical output to amplifier 74. Amplifier 74 may be configured to drive transistor 76 and armature 22 as a continuous function of such sensor output signal. Alternatively, amplifier 74 may comprise a threshold detector for switching current to armature 22 when the fuel pressure within housing 18 is below a preselected threshold level, and removing current from armature 22 when fuel pressure is above such threshold level.

The invention claimed is:

1. A self-contained electric fuel pump which includes a pair of coaxially spaced end caps and a case joining said end caps to form a pump housing, fuel inlet means in one of said end caps and fuel outlet means in the other of said end caps, a d.c. motor including an armature journaled for rotation within said housing, means coupled to said armature for pumping fuel through said housing from said inlet means to said outlet means such that fuel within said housing surrounding said armature is at substantially outlet pressure, and means for applying electrical power to said armature, characterized in that said power-applying means comprises a bore in said other end cap having an axial end opening into said housing and an axis parallel to and radially offset from axis of rotation of said armature, a piston of magnetic construction slidable in said bore as a function of pressure of fuel within said housing, a spring base at an end of said bore remote from said armature and a coil spring captured within said bore between said piston and said spring base, and means responsive to varying magnetic fields as a function of position of said piston within said bore for applying electrical power to said armature as a function of fuel pressure within said housing.

2. The pump set forth in claim 1 wherein said pressure-responsive piston further comprises means for adjusting the position of said spring base axially of said bore.

3. The pump set forth in claim 1 wherein said position-responsive means comprises a Hall-effect sensor carried by said other end cap.

4. The pump set forth in claim 3 wherein said position-responsive means further comprise switch means responsive to said Hall-effect sensor for applying electrical power to said armature when output from said sensor indicates fuel pressure within said housing below a preselected threshold.

5. The pump set forth in claim 3 wherein said Hall-effect sensor is so positioned with respect to said piston and bore as to provide an electrical output signal as a continuous monotonic function of position of said piston within said bore.

6. The pump set forth in claim 5 wherein said position-responsive means comprises means for applying electrical power to said armature as a continuous function of said electrical output signal.

* * * * *